UNITED STATES PATENT OFFICE.

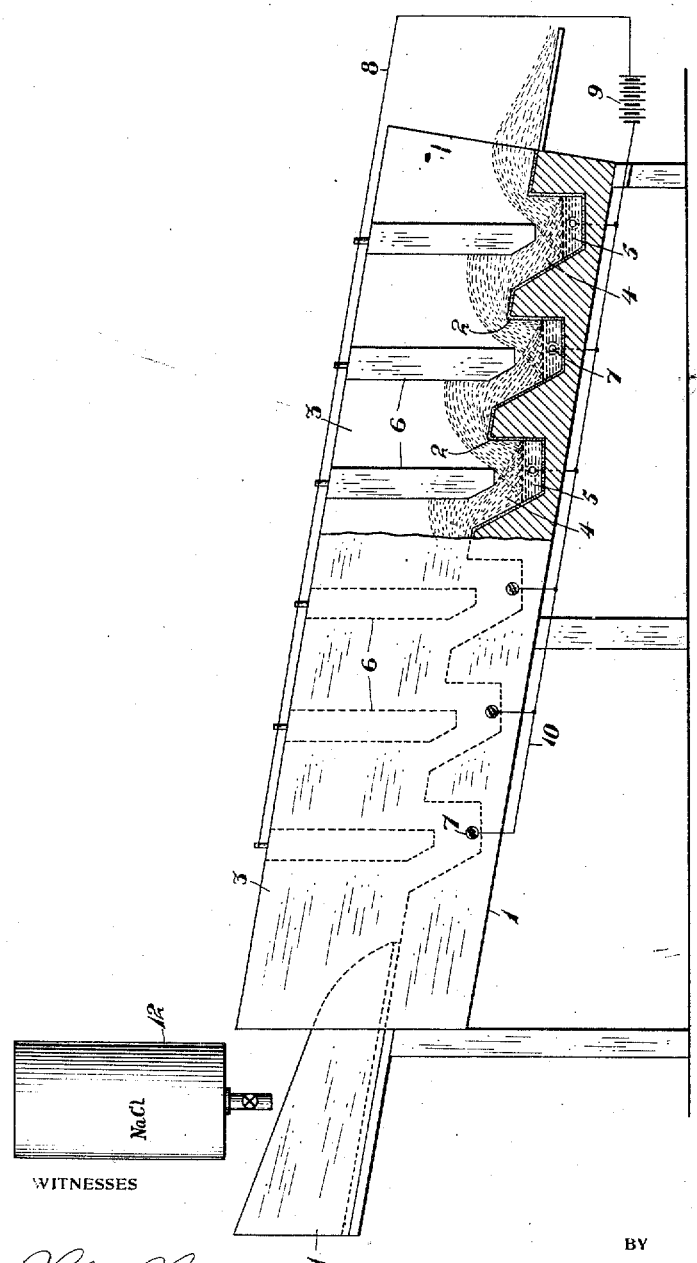

JAMES H. ALLING, OF COLUMBIA, CALIFORNIA, ASSIGNOR OF ONE-HALF TO FRANCIS M. WRIGHT, OF SAN FRANCISCO, CALIFORNIA.

PROCESS OF RECOVERING GOLD.

1,207,261.    Specification of Letters Patent.    Patented Dec. 5, 1916.

Application filed October 18, 1910, Serial No. 587,676. Renewed August 18, 1911. Serial No. 644,889.

*To all whom it may concern:*

Be it known that I, JAMES H. ALLING, a citizen of the United States, residing at Columbia, in the county of Tuolumne and State of California, have invented new and useful Improvements in Processes of Recovering Gold, of which the following is a specification.

My present invention relates to an improved process of recovering fine gold and other precious metals.

The only processes of recovering microscopic gold which are commercially practised, so far as I am aware, are those of cyaniding and chlorination, each of which processes involves the use of large and expensive apparatus, and consumes considerable time and labor. These processes cannot be used simultaneously with the ordinary processes used for recovering particles of gold of larger size, such as passing the pulp containing said particles down sluice boxes formed with riffles or amalgamating plates, or passing it through centrifugal separators. In other words, these processes cannot be used simultaneously with the processes of recovering gold in large particles which take advantage of its great density. Also in United States Letters Patent No. 947,957, issued to me Feb. 1, 1910, I describe and claim a process of recovering comparatively large particles of gold coated with an oxid, said process consisting of the electric decomposition of a chlorin compound to liberate nascent chlorin and at the same time maintain the mercury in a fit condition for amalgamation. In by far the greater number of mines the gold particles are of all sizes, varying from easily visible particles to particles which can be seen only by the microscope; also in many cases some of the gold is covered with an oxid coating. Heretofore, for the recovery of such gold it has been necessary to treat the material containing the gold at separate times by two operations, by one of which the coarser gold is recovered, and by the other of which are treated the tailings, after the coarser gold has been extracted, the latter process being slow and expensive. Moreover, when treating by the process in my patent referred to particles of gold having oxid coatings, the nascent chlorin attacks not only said coatings but also the fine microscopic particles having no oxid coatings, and dissolves them, forming trichlorid of gold, from which the gold can only be recovered by slow and expensive processes.

Now the object of my present invention is to provide a process in the operation of which all of said particles, namely, comparatively large particles of clean gold, particles with an oxid coating, and clean microscopic particles of float gold, can be recovered simultaneously, and as rapidly as coarse gold is at present recovered in the ordinary sluice boxes, thus dispensing with the necessity of large and expensive plants, involving a great expenditure of time and labor.

In the accompanying drawing, 1 indicates a sluice box composed of wood, the bottom 2 of which sluice box is thoroughly impregnated with asphaltum by dipping therein and the sides 3 are painted with asphaltum paint. The purpose of this is to render said bottom and sides non-conducting. The bottom of the sluice box is formed with pockets 4, in which is contained mercury, shown at 5. Depending into said pockets, but not in contact with the mercury, are anodes 6, preferably of carbon. Screwed through the sides of the sluice box into said pockets, and into contact with the mercury therein, are screws 7. The anodes 6 are all electrically connected by a conductor 8 to a positive pole of a source 9 of electricity and the screws 7 are all so connected by a conductor 10 to the negative pole of said source. A launder 11 is used to feed the material to the sluice box. A receptacle 12 is also provided to feed a salt solution to said launder.

The following description of the nature of my improved process will be confined to its use for recovering gold, it being understood that the process may be also applied to the recovery of other precious metals.

The pulp containing the auriferous material is discharged on to the launder 11 and therewith is fed, from the receptacle 12, a small quantity of a solution of common salt. I prefer common salt on account of its cheapness, but other chlorin compounds might be used, as for instance, potassium chlorid. Sea water may be used as the salt solution if desired. This pulp, mixed with the salt solution, is caused to pass in succession between the several anodes and corresponding cathodes of the apparatus, and, the current of electricity being turned on, there are formed, within the sluice box, alternating regions, consisting of regions through which electricity is passing, and regions through which it is not passing. Through these regions the mixture of pulp and salt solution flows alternately. In passing beneath an anode, the mixture flows through an electrolytic region, the electric current flowing from the lower surface of the anode to the mercury in the pocket, and between each pair of anodes, the mixture flows through a non-electrolytic region, through which no electricity passes. In flowing through the first of the above electrolytic regions, beneath the first anode, the sodium chlorid and water are by electrolysis decomposed, the sodium chlorid into sodium and chlorid, and the water into hydrogen and hydroxyl, the sodium and hydrogen appearing at the negative electrode and the chlorin and hydroxyl at the positive electrode. On account of the momentum of the mixture, part only of the sodium thus deposited unites with the mercury in the cathode, the remainder escaping therefrom. Such is also the case with the hydrogen, but the part of the hydrogen which is collected at the cathode is proportionately less, on account of its much smaller specific gravity. Sodium hydrogen amalgam is thus formed at the cathode. The chlorin and hydroxyl do not of course appear in the electrolyte between the anode and cathode, but only at the anode, at which chlorin appears in its nascent condition. The nascent chlorin given off at the surface of the anode attacks the fine microscopic particles of gold in the pulp and forms trichlorid of gold. This formation of trichlorid of gold, however, cannot take place in the region through which electrolysis is taking place, being prevented by the current of electricity passing therethrough, which tends to decompose trichlorid of gold. It only takes place outside of said region, or, at the most, at the boundaries thereof, where the electric current is not strong enough to prevent the chemical combination of nascent chlorin with the microscopic particles of gold. Some of it takes place on the front side of the anode, toward which the mixture is flowing, but the greater part of it takes place on the rear side thereof, and particularly in the non-electrolytic region between said anode and the next succeeding anode. From the above explanation it will be seen that it is very important that the lower part of the anode should be well covered with the mixture both at the front and back, so that the nascent chlorin cannot escape into the atmosphere, before performing its duty upon the particles of gold. It is also preferable not to supply too much water to the stream. For instance, a stream consisting of 60 per cent. of pulp and 40 per cent. of water will give better results than one consisting of 40 per cent. of pulp and 60 per cent of water. The sodium and hydrogen which are not deposited permanently upon the cathode, but are washed away therefrom by the force of the stream of water and pulp, pass into the next succeeding non-electrolytic region. Thereupon the sodium unites with the hydroxyl, previously liberated by electrolysis, and forms caustic soda, which chemically combines with any greasy coating of the metallic particles of the pulp, and the hydrogen unites with the chlorin previously liberated, and which has not formed trichlorid of gold, and forms hydrochloric acid. The hydrochloric acid and the caustic soda immediately unite to form common salt and water. The trichlorid of gold which has been thus formed is now carried with the stream of pulp between the next succeeding electrodes, or, if it has been formed in the front of the anode, it is carried between the same electrodes as before referred to. By the electroyltic action of the electric current between said electrodes, the trichlorid of gold is now decomposed, and gold is deposited upon, and amalgamated with, the mercury cathode. In the decomposition of the trichlorid of gold, the chlorin appears again at the positive electrode in a nascent condition, and can attack the particles of fine gold arriving thereat and again form trichlorid of gold, from which gold is obtained in the same way as in that already described, or it may escape, and form, first, hydrochloric acid, and then by the union of hydrochloric acid and caustic soda, a solution of common salt.

While experiments which have been made indicate that the above are the chemical reactions that occur, yet the precise nature of these reactions is not of importance, it being known positively only that the material to be treated should pass alternately through electrolytic and non-electrolytic regions. In an electrolytic region take place the decomposition of salt and trichlorid of gold (if it has been already formed) with the deposition of gold at the cathode and the liberation of chlorin at the anode. In a non-electrolytic region take place recombination of part of the constituent elements thereof, and the combination of said chlorin with gold freshly supplied. However, the only essential feature of the process is that the pulp should be subjected alternately to a condition of electrolysis, and a condition in which electrolysis is not present, so that the constituent elements can again recombine. For practical purposes, it is preferable that this shall be done by causing the auriferous pulp to flow through alternate regions of these characters, but my process is not limited thereto, as the pulp might flow continuously in a stream through which an intermittent current is passed, the intervals between the passages of the current being sufficiently long to permit recombination of the constituent elements.

I am aware that E. P. Thompson in his United States Letters Patent No. 317,245, dated May 5, 1885, discloses a method of recovering gold from auriferous pulp by liberating chlorin from its compounds, as common salt, by electrolysis, then dissolving the gold by the liberated chlorin, and finally depositing by electrolysis the gold from the trichlorid of gold thus formed; also that J. H. Haycraft, in his United States Letters Patent No. 579,872, dated Mar. 30, 1897, discloses a similar method. But I make no claim to the process herein described considered merely as the production of a succession of chemical changes. The object of my invention is to provide a process by which fine or microscopic gold can be recovered, simultaneously and in the same operation, with comparatively large particles of clean gold, and also with coated particles of gold, if such exist, as fast as the auriferous pulp can be delivered from stamp mills or the like, and without the necessity of employing large and expensive apparatus, or operating valves, or removing the material bodily from one vessel to another, or in fact devoting any attention whatever to the operation of the process after once properly starting it. My process is therefore distinguished from those of Thompson and Haycraft in that the mixture is caused to flow in a continuous stream, the worthless gangue being removed continuously from the end thereof as the mixture is supplied continuously to the beginning of said stream, and said stream is caused to pass through a large number of pairs of alternating electrolytic and non-electrolytic regions. By the inclusion in my process of the first step above mentioned I am enabled in the same operation to combine the present process with the well known process of recovering large free particles of gold by taking advantage of the great density of gold, as in sluice boxes or in centrifugal separators, and also to treat the material very rapidly, as fast as it can be supplied by stamp mills or the like, getting rid of the worthless gangue while retaining the recovered gold, and by including the second above mentioned step of the above process, I am enabled to obtain the results above mentioned, due to the first step, and yet not permit any of the gold to escape, since, if, in the first non-electrolytic region, fine particles of gold escape the action of nascent chlorin, and are therefore not deposited on passing through the next electrolytic region, such particles are almost certain to be dissolved by the nascent chlorin in the second non-electrolytic region or in the subsequent non-electrolytic regions.

A remarkable advantage of my present process is that the more minute the gold is and therefore the more difficult to recover by ordinary sluice box or continuous flow methods, the more easily it is recovered by my present method, which is also a continuous flow method, since the more readily is it acted upon by the nascent chlorin to form trichlorid of gold.

Since this process can be used in combination with the ordinary mechanical process of recovering gold suitable particularly to particles of visible size or thereabout, the latter process being assisted by the formation of sodium hydrogen amalgam, and also with my patented process above referred to for recovering coated gold, it provides, with said processes, a highly advantageous method of recovering gold, since by the simultaneous operation of these processes particles of all sizes are recovered, and thus a complete recovery of the gold from the pulp is effected.

In the practical application of the above process to recover gold from ores of different mines, it is generally necessary to vary the process according to the alkali or acid condition of said ores. If said ores have an alkaline base, then it is necessary to add hydrochloric acid to counteract the effect of said alkaline base, otherwise the alkali would absorb too much of the chlorin. On the contrary, if the ores, such as sulfites, have an acid base, then it is necessary to add an alkali, such as chlorid of lime, to counteract the effects of the acid on the sodium.

For the sake of brevity only, the process as claimed will be confined to that of recovering gold, it being understood that the same process may be applied to other precious metals.

I claim:—

1. The process of recovering gold from auriferous pulp, which consists in mixing the pulp with an aqueous solution of common salt, passing said mixture once only in a continuous stream through a series of pairs of regions, the first region of each pair being electrolytic and the second non-electrolytic, continuously supplying the mixture to the beginning of said stream, continuously removing the worthless gangue from the end thereof, and collecting the gold from the negative electrodes of said electrolytic regions, substantially as described.

2. The process of recovering gold from auriferous pulp, which consists in mixing the pulp with an aqueous solution of common salt, causing said mixture to flow in a continuous stream, repeatedly subjecting the mixture while flowing in said stream to the electrolytic action of an electric current at intervals sufficiently long to permit chemical combination of the liberated nascent chlorin and gold in the mixture, continuously supplying the mixture to the beginning of said stream, continuously removing the worthless gangue from the end thereof, and collecting the gold from the cathode region, substantially as described.

3. The process of recovering gold from auriferous pulp, which consists in mixing the pulp with a solution of a chlorin compound decomposable by an electric current, passing said mixture once only in a continuous stream through a series of pairs of regions, the first region of each pair being electrolytic and the second non-electrolytic, continuously supplying the mixture to the beginning of said stream, continuously removing the worthless gangue from the end thereof, and collecting the gold from the negative electrodes of said electrolytic regions, substantially as described.

4. The process of recovering gold from auriferous pulp, which consists in mixing the pulp with a solution of a chlorin compound decomposable by an electric current, causing said mixture to flow in a continuous stream, repeatedly subjecting the mixture while flowing in said stream to the electrolytic action of an electric current at intervals sufficiently long to permit chemical combination of the liberated nascent chlorin and gold in the mixture, continuously supplying the mixture to the beginning of said stream, continuously removing the worthless gangue from the end thereof, and collecting the gold from the cathode region, substantially as described.

5. The process of recovering gold from auriferous pulp, which consists in mixing the pulp with an aqueous solution of common salt, passing said mixture once only in a stream through a series of alternate electrolytic and non-electrolytic regions so that the whole of said mixture has free access to the cathodes in the electrolytic regions, supplying the mixture to the beginning of said stream, removing the worthless gangue from the end thereof, and collecting the gold from the negative electrodes of said electrolytic regions.

6. The process of recovering gold from auriferous pulp, which consists in mixing the pulp with an aqueous solution of common salt, causing said mixture to flow in a stream, repeatedly subjecting the mixture while flowing in said stream to the electrolytic action of an electric current at intervals sufficiently long to permit chemical combination of the liberated nascent chlorin and gold in the mixture, and also repeatedly directing the mixture while so flowing in said stream into close proximity with amalgamating surfaces, supplying the mixture to the beginning of said stream, removing the worthless gangue from the end thereof, and collecting the gold from the cathode region.

7. The process of recovering gold from auriferous pulp, which consists in mixing the pulp with a solution of a chlorin compound decomposable by an electric current, passing said mixture once only in a stream through a series of alternately electrolytic and non-electrolytic regions so that said mixture has free access to the cathodes in the electrolytic regions, supplying the mixture to the beginning of said stream, removing the worthless gangue from the end thereof, and collecting the gold from the negative electrodes of said electrolytic regions.

8. The process of recovering gold from auriferous pulp, which consists in mixing the pulp with a solution of a chlorin compound decomposable by an electric current, causing said mixture to flow in a stream, repeatedly subjecting the mixture while flowing in said stream to the electrolytic action of an electric current at intervals sufficiently long to permit chemical combination of the liberated nascent chlorin and gold in the mixture, and also repeatedly directing the mixture while so flowing in said stream into close proximity with amalgamating surfaces, supplying the mixture to the beginning of the stream, removing the worthless gangue from the end thereof, and collecting the gold from the cathode region.

9. The process of recovering gold from auriferous pulp, which consists in mixing the pulp with an aqueous solution of common salt, causing said mixture to flow by gravity only in a stream through a series of alternate electrolytic and non-electrolytic regions supplying the mixture to the beginning of said stream, removing the worthless gangue from the end thereof, and collecting the gold from the negative electrodes of said electrolytic regions.

10. The process of recovering gold from auriferous pulp, which consists in mixing the pulp with an aqueous solution of common salt, causing said mixture to flow by gravity only in a stream, repeatedly subjecting the mixture while flowing in said stream to the electrolytic action of an electric current at intervals sufficiently long to permit chemical combination of the liberated nascent chlorin and gold in the mixture, supplying the mixture to the beginning of said stream, removing the worthless gangue from the end thereof, and collecting the gold from the cathode region.

11. The process of recovering gold from auriferous pulp, which consists in mixing the pulp with a solution of a chlorin compound decomposable by an electric current causing said mixture to flow by gravity only in a stream through a series of alternate electrolytic and non-electrolytic regions, supplying the mixture to the beginning of said stream, removing the worthless gangue from the end thereof, and collecting the gold from the negative electrodes of said electrolytic regions.

12. The process of recovering gold from auriferous pulp, which consists in mixing the pulp with a solution of a chlorin compound decomposable by an electric current, causing said mixture to flow by gravity only in a stream, repeatedly subjecting the mixture while flowing in said stream to the electrolytic action of an electric current at intervals sufficiently long to permit chemical combination of the liberated nascent chlorin and gold in the mixture, supplying the mixture to the beginning of said stream, removing the worthless gangue from the end thereof, and collecting the gold from the cathode region.

13. The process of recovering gold from auriferous pulp, which consists in mixing the pulp with an aqueous solution of common salt, passing said mixture once only in a continuous vertically undulating stream through a series of pairs of regions, the first region of each pair being electrolytic and the second non-electrolytic, and the cathodes of said electrolytic regions being at the bottoms of said undulations, continuously supplying the mixture to the beginning of said stream, continuously removing the worthless gangue from the end thereof, and collecting the gold from the negative electrodes of said electrolytic regions, substantially as described.

14. The process of recovering gold from auriferous pulp, which consists in mixing the pulp with a solution of a chlorin compound decomposable by an electric current, passing said mixture once only in a continuous vertically undulating stream through a series of pairs of regions, the first region of each pair being electrolytic and the second non-electrolytic, and the cathodes of said electrolytic regions being at the bottoms of said undulations, continuously supplying the mixture to the beginning of said stream, continuously removing the worthless gangue from the end thereof, and collecting the gold from the negative electrodes of said electrolytic regions, substantially as described.

15. The process, which consists in mixing metalliferous pulp with a solution of a compound decomposable by an electric current into components, one of which can dissolve the metal and be separated therefrom by electrolysis, causing said mixture to flow in a stream through a series of alternate electrolytic and non-electrolytic regions, so that the whole of the mixture has free access to the cathodes in the electrolytic regions, supplying the mixture to the beginning of said stream, removing the worthless gangue from the end thereof, and collecting the gold from the negative electrodes of said electrolytic regions.

16. The process which consists in mixing pulp containing a metal soluble in an aqueous or similar solution with a solution of a compound decomposable by an electric current into components, one of which can dissolve the metal and be separated therefrom by electrolysis, causing said mixture to flow by gravity only in a stream through a series of alternate electrolytic and non-electrolytic regions, supplying the mixture to the beginning of said stream, removing the worthless gangue from the end thereof, and collecting the metal from the negative electrodes of said electrolytic regions.

17. The process which consists in mixing pulp containing a metal soluble in an aqueous or similar solution with a solution of a compound decomposable by an electric current into components, one of which can dissolve the metal and be separated therefrom by electrolysis, passing said mixture once only in a continuous vertically undulating stream through a series of pairs of regions, the first region of each pair being electrolytic and the second non-electrolytic, and the cathodes of said electrolytic regions being at the bottoms of said undulations, continuously supplying the mixture to the beginning of said stream, continuously removing the worthless gangue from the end thereof, and collecting the metal from the negative electrodes of said electrolytic regions, substantially as described.

18. The process of recovering precious metals which consists in mixing metalliferous pulp with a suitable electrolyte solution, causing said mixture to flow in a continuous stream, passing an electric current through the mixture to decompose said solution, then permitting the ions separated by the electrolysis to chemically react upon the pulp, and then passing an electric current through the pulp so acted on to deposit the metal upon the cathode, while continuously supplying fresh mixture at the beginning of the stream to be so treated and continuously removing worthless material at the end thereof.

19. The process of recovering a metal soluble in an aqueous or similar solution which consists in mixing pulp containing the metal with a suitable electrolyte solution, causing said mixture to flow in a continuous stream, passing an electric current through the mixture to decompose said solution, then permitting the ions separated by the electrolysis to chemically react upon the pulp, and then passing an electric current through the pulp so acted on to deposit the metal upon the cathode, while continuously supplying fresh mixture at the beginning of the stream to be so treated and continuously removing worthless material at the end thereof.

In testimony whereof I have hereunto set my hand in the presence of two subscribing witnesses.

JAMES H. ALLING.

Witnesses:
F. M. WRIGHT,
D. B. RICHARDS.